(12) United States Patent
Poole et al.

(10) Patent No.: US 9,804,284 B2
(45) Date of Patent: Oct. 31, 2017

(54) GHOST-SUPPRESSION OPTIMIZED SEISMIC SOURCE AND METHOD

(71) Applicant: CGG SERVICES SA, Massy (FR)

(72) Inventors: Gordon Poole, East Grinstead (GB); Robert Dowle, Massy (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/915,932

(22) PCT Filed: Sep. 12, 2014

(86) PCT No.: PCT/EP2014/069525
§ 371 (c)(1),
(2) Date: Mar. 2, 2016

(87) PCT Pub. No.: WO2015/036554
PCT Pub. Date: Mar. 19, 2015

(65) Prior Publication Data
US 2016/0195628 A1 Jul. 7, 2016

Related U.S. Application Data

(60) Provisional application No. 61/876,827, filed on Sep. 12, 2013.

(51) Int. Cl.
*G01V 1/38* (2006.01)
(52) U.S. Cl.
CPC .......... *G01V 1/3861* (2013.01); *G01V 1/3808* (2013.01); *G01V 1/3817* (2013.01);
(Continued)

(58) Field of Classification Search
CPC .. G01V 1/3808; G01V 1/3817; G01V 1/3861; G01V 2210/56; G01V 2210/127; G01V 2210/1293
(Continued)

(56) References Cited

U.S. PATENT DOCUMENTS

2004/0089499 A1   5/2004  Smith
2006/0239117 A1* 10/2006  Singh ................... G01V 1/3808
                                                           367/20
(Continued)

FOREIGN PATENT DOCUMENTS

WO    2009/077762 A2   6/2009
WO    2015/011160 A1   1/2015

OTHER PUBLICATIONS

International Search Report in related International Application No. PCT/EP2014/0695525, dated Jun. 17, 2015.
(Continued)

*Primary Examiner* — Daniel L Murphy
(74) *Attorney, Agent, or Firm* — Patent Portfolio Builders PLLC (57) ABSTRACT

A marine seismic source includes source elements configured to emit waves having different frequencies while the source elements are towed at different predetermined depths, respectively. The predetermined depths are calculated such that water-surface reflections of the waves generated by a source element among the source elements interfere constructively with the waves generated by the source element and propagating toward an explored structure under the seafloor. The waves combine to yield a spike-like signature of the source.

17 Claims, 10 Drawing Sheets

(52) U.S. Cl.
CPC .................. *G01V 2210/127* (2013.01); *G01V 2210/1293* (2013.01); *G01V 2210/56* (2013.01)

(58) Field of Classification Search
USPC .............................................. 367/15, 16, 23
See application file for complete search history.

(56) References Cited

U.S. PATENT DOCUMENTS

2013/0279290 A1   10/2013  Poole
2014/0293741 A1*  10/2014  Halliday ................ G01V 1/145
                                                                     367/14

OTHER PUBLICATIONS

Written Opinion of the International Searching Authority in related International Application No. PCT/EP2014/0695525, dated Jun. 17, 2015.

* cited by examiner

GHOST-SUPPRESSION OPTIMIZED SEISMIC SOURCE AND METHOD

CROSS REFERENCE TO RELATED APPLICATIONS

This application claims priority and benefit from U.S. Provisional Patent Application No. 61/876,827, filed Sep. 12, 2013, for "Ghost optimized source array design," the content of which is incorporated in its entirety herein by reference.

BACKGROUND

Technical Field

Embodiments of the subject matter disclosed herein generally relate to marine seismic sources configured to emit waves at different predetermined depths selected by taking into consideration the effect of the water-surface reflections of the waves (known as "ghosts").

Discussion of the Background

Seismic surveys are used to probe an underground structure to obtain an astute indication about the hydrocarbon content thereof. During such a seismic survey, seismic waves, which penetrate the underground structure, bounce off its layer interfaces and are detected by seismic receivers. Seismic survey methods are used in land and in marine environments.

In a marine environment, seismic waves are emitted by a marine seismic source and detected by seismic receivers (hydrophones, marine particle motion sensors such as accelerometers or differential pressure sensors, geophones, or any other type of acoustic or elastic wave detector). The source and the receivers may be towed over the surveyed structure (which is under the seafloor) or placed on the seafloor. The source often includes plural individual devices such as air guns, pingers, sparkers, boomers, marine vibrators, other acoustic emission devices, or combinations thereof. The source may emit energy (i.e., waves) impulsively, continuously, or semi-continuously, with a predetermined signature (mono-frequency, pseudo-random sweep, regular sweep, etc.).

A seismic source emits waves (i.e., energy) in all directions away from the source. Up-going waves, which propagate toward the water surface, are reflected at the water-air interface. The water-surface reflected waves, known as "ghosts," have opposite polarity than the up-going waves and propagate toward the seafloor. Ghosts interfere with the energy which left the source downwards. The energy which left the source downwards is often termed 'primary energy'. The energy reflected at the sea surface is termed 'ghost energy'.

For conventional sources, the presence of ghosts increases the complexity of seismic data processing by causing signals with complex source signatures (i.e., amplitude versus time at large distance from the source) incident to the seafloor. The complex signature signal is a challenge for data processing and limits data density. Methods for de-ghosting seismic data as described, for example, in U.S. Patent Application Publication 2013/0279290 are challenging. It would be desirable to improve the seismic sources such that to eliminate the complexity due to the ghosts at data acquisition stage, and thus to simplify the seismic data processing.

SUMMARY

In various embodiments, seismic sources having plural individual source elements are arranged at different predetermined depths and emit waves having different frequencies. The predetermined depths may be calculated such that ghosts interfere constructively with the primary energy. The individual seismic sources may be arranged and activated to yield a spike-like source signature.

According to one embodiment, there is a marine seismic source having a series of source elements configured to emit waves having different frequencies while the source elements are towed at different predetermined depths. The predetermined depths are calculated such that down-going waves interfere constructively with water-surface reflections of up-going waves generated by a same one among the source elements. The waves combine to yield a spike-like signature.

According to another embodiment, there is a marine seismic source having cable segments with source elements mounted along each segment. The cable segments are configured to be connected one after another to form a towed line or rope.

According to yet another embodiment, there is a marine seismic survey system including a marine seismic source and marine seismic receivers. The marine seismic source includes a series of source elements configured to emit waves having different frequencies while towed at different predetermined depths. The predetermined depths are calculated such that down-going waves interfere constructively with reflections of up-going waves generated by a same one among the source elements, and the waves combine to yield a spike-like signature. The marine seismic receivers are configured to detect the waves after being reflected from an explored structure under the seafloor.

According to yet another embodiment, there is a method for generating waves usable for exploring a formation under the seafloor. The method includes towing source elements in water, at different predetermined depths. The method further includes controlling the source elements to emit waves having different frequencies, respectively, according to a sequence determined based on the predetermined depths. The predetermined depths are calculated such that water-surface reflections of the waves interfere constructively with the waves propagating toward the explored formation, and the waves combine to yield a spike-like signature of the source.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine seismic survey system. However, it should be understood that the methods may be applied for land seismic surveys and/or other types of waves.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments or claims.

According to an embodiment, a marine seismic source includes a series of source elements configured to emit waves having substantially different frequencies while the source elements are towed at different predetermined depths, respectively. The predetermined depths are calculated such that down-going waves interfere constructively with water-surface reflections of up-going waves (i.e., ghosts) generated by the same source element. Due to this arrangement, the presence of ghosts is converted from a disadvantage (i.e., increasing the complexity of seismic data processing) to an advantage (i.e., enhancing the signal carrying underground information). Moreover, the series of source elements are arranged and emit such that to yield a spike-like signature, i.e., at a large distance under the source elements, the waves emitted by the different source elements combine to yield a large amplitude signal for a short time interval (few ms), i.e., a spike-like shape. The large amplitude signal is substantially larger than earlier or later pressure variations at a location on its path.

Figure 1:
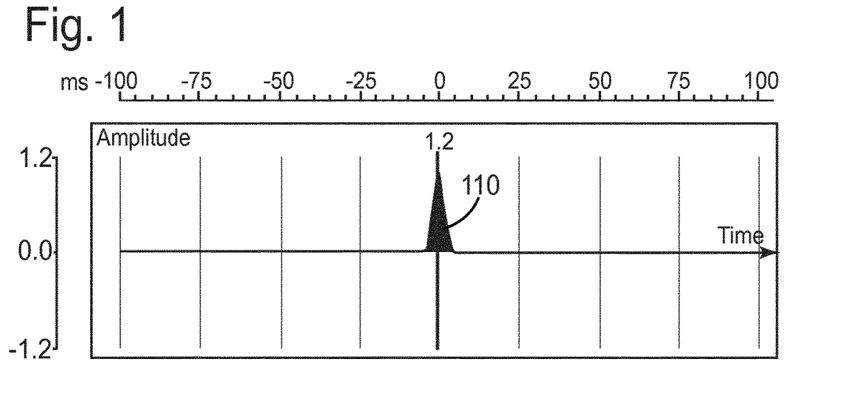
FIG. 1 is graph illustrating an initial pulse emitted by a source.
Figure 2:
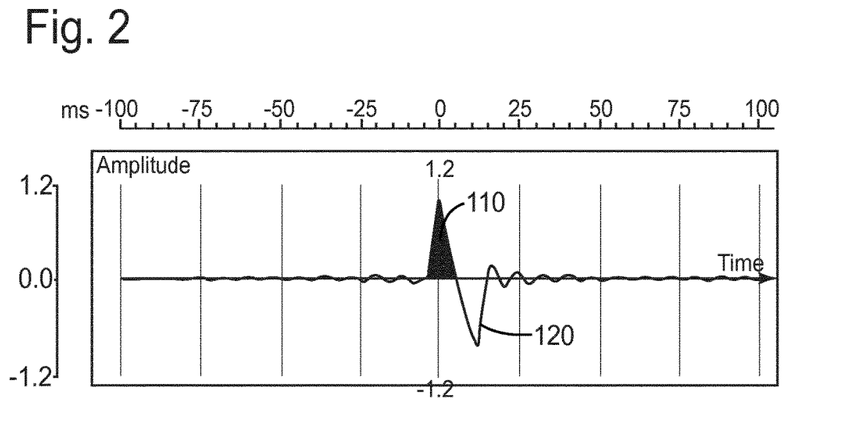
FIG. 2 is a graph illustrating the initial pulse and the corresponding vertical ghost.

To explain the manner the predetermined depths are determined, consider in an initial pulse 110 (amplitude on y-axis and time on x-axis) generated by a source at 8 m depth illustrated in FIG. 1, the waves propagating in water with 1,480 m/s. FIG. 2 shows the initial pulse 110 and the corresponding vertical ghost 210 as recorded by a seismic sensor. As the initial energy was a pulse in this case, the ghosted data in FIG. 2 may be described as the result of applying a re-ghosting operator to primary energy.

Figure 3:
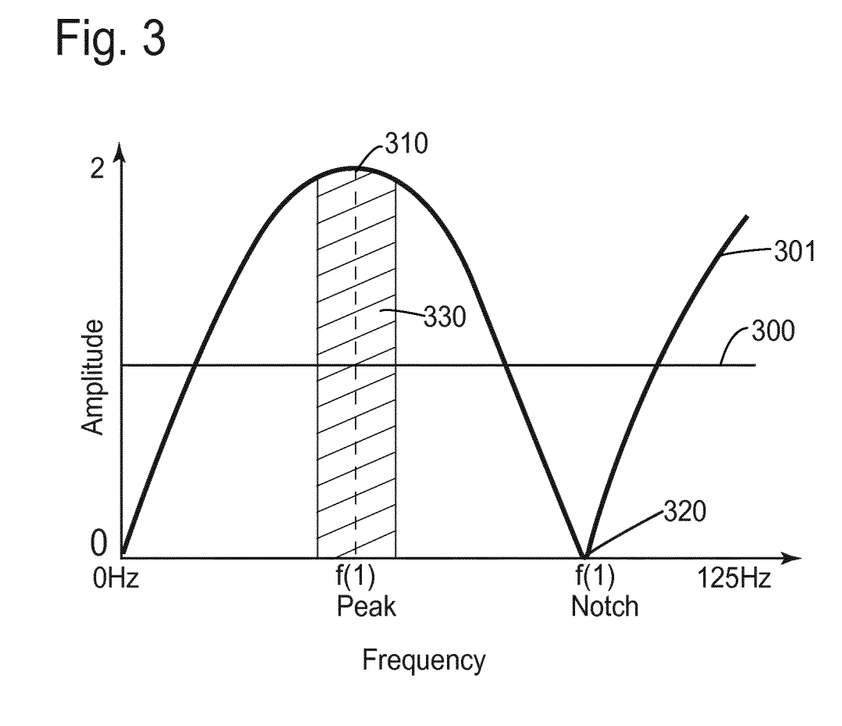
FIG. 3 is a spectra of the interference of the primary wave and ghost.

Waves travelling vertically, i.e., the down-going waves and the ghosts interfere constructively and destructively while propagating toward the seafloor depending of the frequency. While waves are generated to have a constant amplitude spectrum 300 as shown in FIG. 3, a wave resulting from interference of the down-going waves with the vertical ghost exhibits a spectrum 301 having frequency peaks such as 310 and frequency notches such as 320. The ghost-related frequency notches occur at frequencies $f_{notch}$ calculated using the formula:

$$f_{notch}(n) = \frac{nv}{2z} \quad (1)$$

where v is the wave propagation velocity in the layer of water between the source and the water-air interface, z is the source depth, and n is an integer value (n=1, 2, 3, etc.). Thus, the first notch occurs at $$\frac{v}{2z},$$

the second notch occurs at $$\frac{2v}{2z},$$

the third notch at $$\frac{3v}{2z},$$

etc.

The ghost-related frequency peaks for waves traveling vertically occur at frequencies $f_{peak}$ calculated using the formula:

$$f_{peak}(n) = \frac{(n-0.5)v}{2z} \quad (2)$$

where v, z and n have the same significance as in formula (1).

Figure 4:
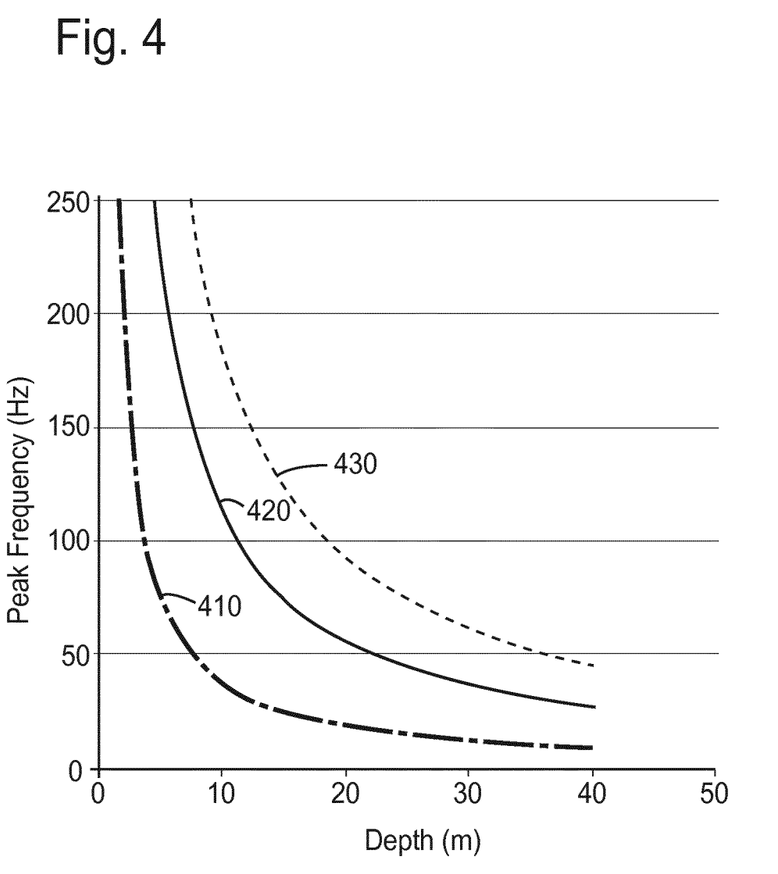
FIG. 4 is a graph illustrating frequency of peaks in the interference spectra versus depth.

FIG. 4 is a graph illustrating $f_{peak}$ on y axis versus source depth z on x axis for n=1 curve 410, for n=2 curve 420 and for n=3 curve 430. Formulas (1) and (2) may be extended to take into consideration that the waves travel at different angles (i.e., not vertically).

Figure 5:
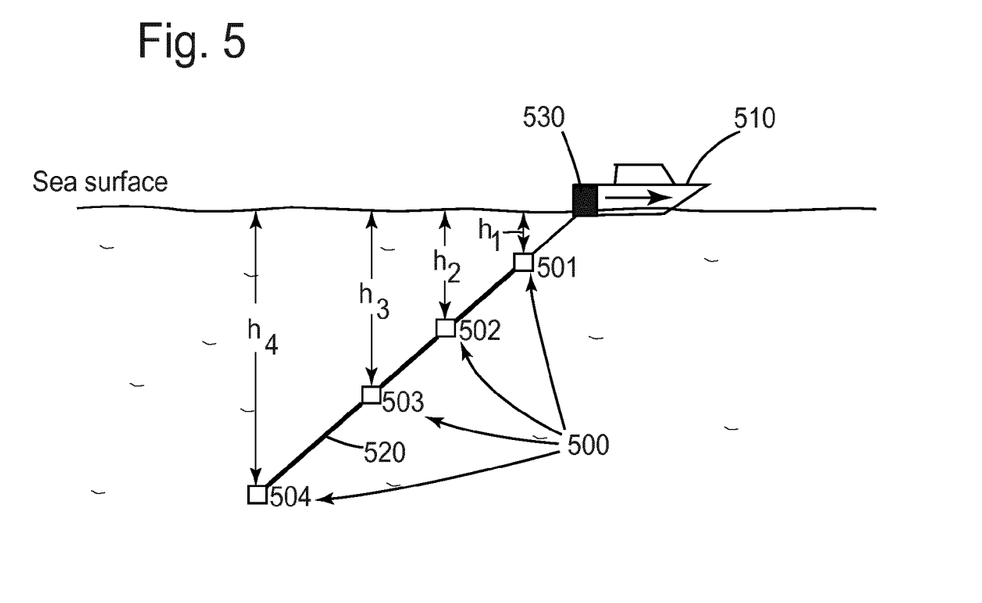
FIG. 5 is a marine seismic source according to an embodiment.

The spike-like signature noted above may be achieved according to an embodiment by a marine seismic source 500 as illustrated in FIG. 5. Source 500, which is towed by a vessel 510, includes a series of individual source elements 501, 502, 503, 504. Source elements 501, 502, 503 and 504 are configured to emit waves having different frequencies $f_1$, $f_2$, $f_3$ and $f_4$, and are towed at different predetermined depths $h_1$, $h_2$, $h_3$ and $h_4$. It should be understood that frequencies $f_1$, $f_2$, $f_3$ and $f_4$ are different, but they do not necessarily signify a single frequency, each source element potentially emitting waves in a narrow range of around a predetermined frequency as discussed later.

The source elements may be air-guns, pingers, sparkers, boomers, marine vibrators, other acoustic emission devices or a combination of devices. In one embodiment, individual source elements may include different sized air-guns. Larger air-guns emit lower frequency waves than smaller air-guns. An individual air-gun among different sized air-guns is towed at a depth where, for its peak frequency, the ghost and the primary undergo constructive interference. Air-guns may fire substantially at the same time, with time delays relating to their depth, or with desynchronized timing. Generally, regardless of the type or types of individual source elements in the series, each individual source element has a peak frequency based on which towing depth is determined to achieve constructive interference between the ghost and the primary wave.

Individual sources may be mounted on a slanted (having a single slope or including plural segments with different slopes), curved, V-shaped, sinusoidal, or otherwise shaped variable-depth tow line or mini-streamer. The line may be orientated parallel to the towing direction, perpendicular to the towing direction, or at another direction. Source elements 501-504 in FIG. 5 are mounted on a linear tow line 520, which provides a physical and an electronic connection to vessel 510. The tow line transmits a towing force, but it also houses electrical conductors configured to transmit power and control signals to the source elements. A single cable may be used for all the source elements leading to improved operational efficiency over having each source element receiving power and control signals via separate wires.

Depth monitoring devices and various passive or active position control devices (e.g., weights, birds, floaters, deflectors, etc.) may be mounted along the tow line to achieve, monitor and, if necessary, adjust its position. For example, a weight may be attached to a distal end of the tow line to determine in combination with the towing speed (and thus water resistance) the angle of the tow line with the sea surface and/or with vertical (gravity) direction.

In some embodiments, the tow line may be formed by connecting plural cable segments carrying the source elements. These cable segments may be configured to have multiple source-element-mounting points to allow flexibility regarding the number, the location along the segment, and/or the type of the individual source element(s) mounted thereon. The cable segments may be configured to be connected one after another to form a towed line or rope. The cable segments may be physically and/or electrically connected. In one embodiment, a connector may be buffered between the ends of consecutive segments. The cable segments may be solid, rigid or partially filled with a gas, liquid or gel. The cable segment ends may be at different depths while towed to enable the source elements to be towed at different predetermined depths.

Figure 6:
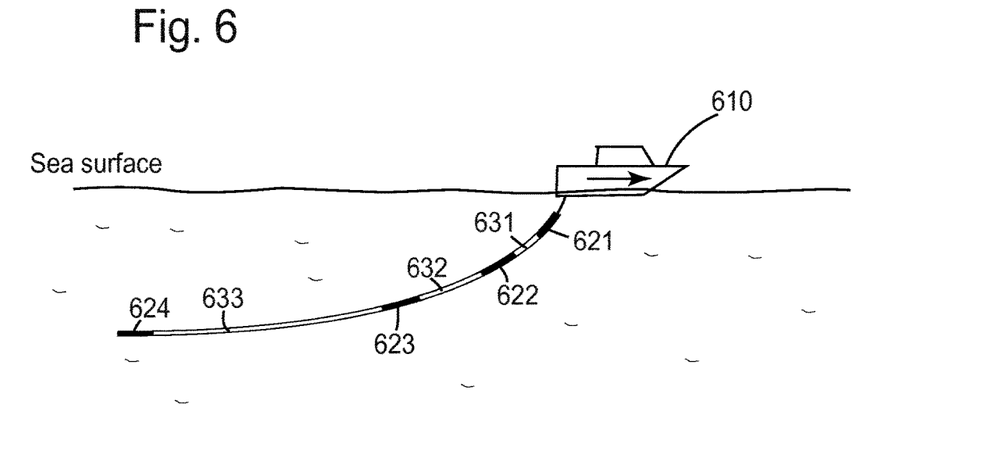
FIG. 6 is a marine seismic survey system according to an embodiment.

One or more of the cable segments may be connected to streamer sections. For example, in the marine seismic survey system illustrated in FIG. 6, source cable sections 621, 622, 623, 624 are interleaved with streamer sections 631, 632 and 633. The connected cable segments may have various profiles, for example: a linear profile (substantially parallel with the water surface or slanted), a profile made of plural linear segments with different slopes or a curved profile. In one embodiment, the curved profile (or at least a portion thereof) may be described by a parameterized equation (e.g., hyperbola, parabola, circle, etc). The connection between a cable section and a streamer section may include electrical connectivity. The streamer sections may carry hydrophones, geophones, particle motion sensors or other receivers. In one embodiment, one or more among the cable segments host both receiver and source elements.

Returning now to FIG. 5, in one embodiment, the individual source elements are marine vibrators emitting each a single frequency, with the emitted frequencies different from one vibrator at a certain depth to another vibrator at another depth. The depths of the individual source elements (e.g., $h_1$, $h_2$, $h_3$ and $h_4$ in FIG. 5) and the emitted frequencies may be correlated such that the ghosts enhance the primary signal (i.e., down-going wave) incident on the explored structure under the seafloor. Based on formula (2), if the vibrators emitting a single frequency wave $f_{vib}$ are towed at depths z calculated with the formula $$z = \frac{(n-0.5)v}{2f_{vib}} \quad (3)$$

then optimal ghost constructive interference with the down-going (primary) wave emitted by the source occurs. Instead of each vibrator emitting a different frequency at a different depth, in one embodiment, a vibrator group is positioned at each depth (i.e., there is more than one vibrator at each depth).

When a series of vibrators are placed at different depths and emit different frequencies related to the depths as in formula (3), the combined wave incident on the explored structure under the seafloor looks close to a delta-function (also known as a Dirac function or a spike). The more individual sources, the closer the combined wave incident on the explored structure under the seafloor is to the delta-function. For example, the following Table 1 lists parameters of a series of sixteen individual marine vibrators emitting waves that propagate in water with a velocity of about 1,500 m/s.

TABLE 1

| Vibrator index | Vibrator frequency (Hz) | Vibrator depth (m) | Vibrator delay (ms) |
|---|---|---|---|
| 1 | 3.125 | 120 | 80 |
| 2 | 6.250 | 60 | 40 |
| 3 | 9.375 | 40 | 26.6 |
| 4 | 12.500 | 30 | 20 |
| 5 | 15.625 | 24 | 16 |
| 6 | 18.750 | 20 | 13.333 |
| 7 | 21.875 | 17.14 | 11.42 |
| 8 | 25.000 | 15 | 10 |
| 9 | 28.125 | 13.36 | 8.89 |
| 10 | 31.250 | 12 | 8 |
| 11 | 34.375 | 10.91 | 7.29 |
| 12 | 37.500 | 10 | 6.66 |
| 13 | 40.625 | 9.23 | 6.15 |
| 14 | 43.750 | 8.57 | 5.71 |
| 15 | 46.875 | 8 | 5.33 |
| 16 | 50.000 | 7.5 | 5 |

The sources in Table 1 have frequency peaks that correspond to n=1, but this value of n is an illustration and not a limitation (i.e., other or various values of n may be used). The listed frequencies form an arithmetic series with differences between consecutive terms being 3.125 Hz. Since the lowest frequency is 3.125 Hz, frequencies of elements 2-16 are multiples of the lowest (base) frequency. The different predetermined depths are correlated with the different frequencies of the waves emitted by the source elements, such that products of the different predetermined depths and the different frequencies, respectively, are substantially (within the representation accuracy limit) equal to the same value, 375 m/s. However, the frequencies being multiples of the lowest (base) frequency of forming an arithmetic series are merely examples, which are not intended to be limiting.

In another embodiment, the frequencies of the series have a different and/or varying frequency interval there-between. In yet another embodiment, the frequencies may form a geometric series where higher frequencies are sampled more coarsely than low frequencies. In another embodiment, the frequencies may be selected to have the same number of frequencies per octave (i.e., frequency doubling between the highest and lowest frequency of the octave). As discussed before, instead of emitting a single frequency, the vibrators may be configured to emit a range of frequencies selected to substantially benefit from constructive interference of the down-going waves with the free surface ghost.

The delay for each vibrator is calculated so that the down-going (i.e., vertically incident on the explored formation under the seafloor) energy (waves) from each vibrator interfere constructively at a predetermined time. Thus, relative to a common start time, an individual time delay of a source element is the depth of that source element divided by the velocity of the wave propagating in water. Source 500 may also include a controller 530, which may be carried by vessel 510, which controller is configured to control the source elements to emit the waves with predetermined time delays relative to the same start time, respectively, to optimize interferences leading to the spike-like signature.

Figure 7:
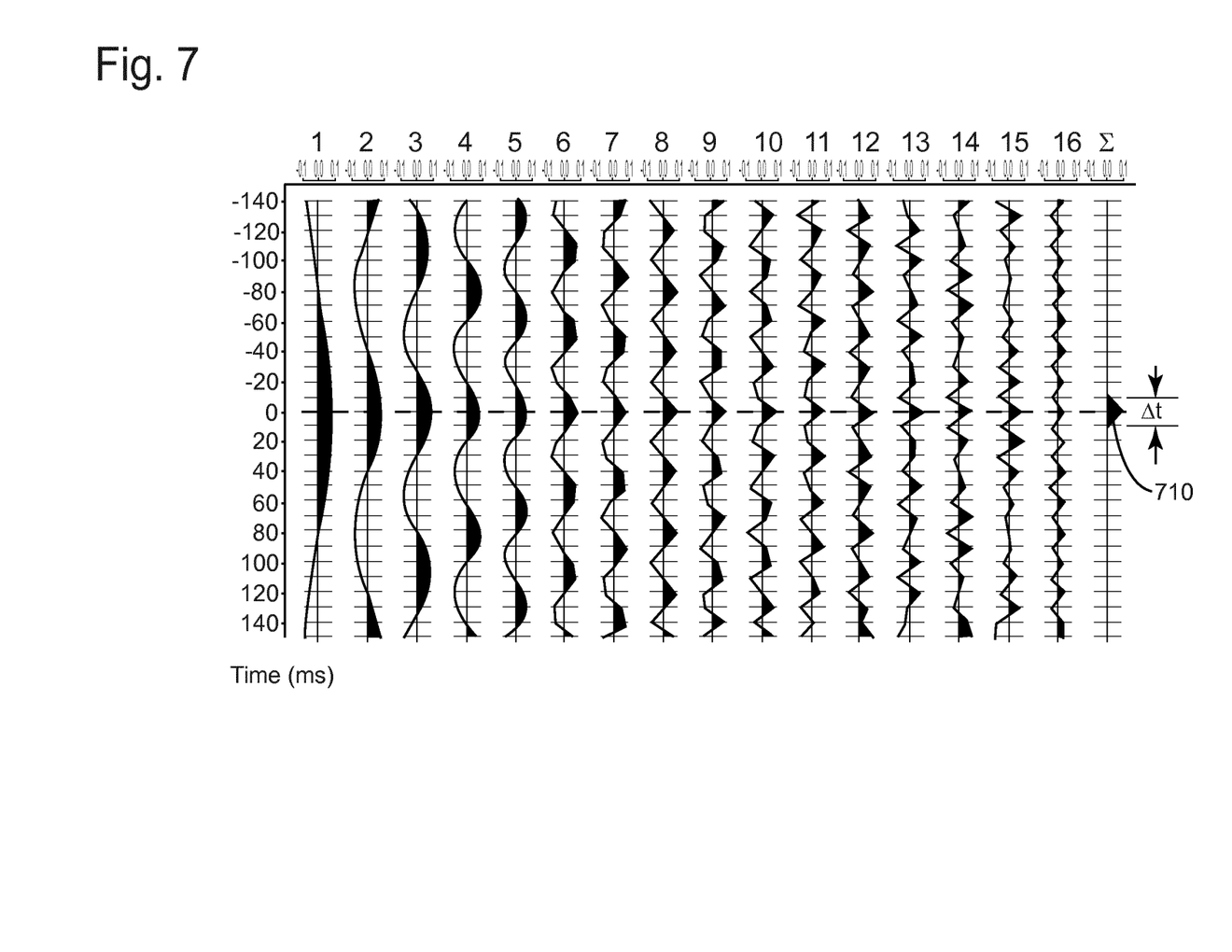
FIG. 7 illustrates the effect of the superposition of the waves.

FIG. 7 illustrates the effect of the waves' superposition for a source having 16 source elements. In FIG. 7, amplitude (horizontal) versus time graphs corresponding to the sixteen vibrators (labeled on top as 1-16) are added in the graph labeled as "Σ" which shows a single spike 710 lasting Δt (few ms). In other words, the waves combine to yield a spike-like signature of the source. The waves interfere constructively to form the spike during few ms around a "time zero" and interfere destructively otherwise.

Thus, the wave incident to the explored subsurface formation is free of ghosts distinct from the primaries that would be otherwise present. The vibrators are activated periodically according to the sequence based on delays calculated to yield such a single spike. Periodic single spikes have, when represented versus time, a comb appearance, for example, a spike occurring at every 150 ms. The emitted waves may be modified as a function of time so that instead of impulsive energy (spike-like signal) occurring with a regular timing, the impulse occurs at irregular intervals. The intervals may be random or optimized so as to help the separation of energy relating to different impulses. Due to inaccuracies in depth or the variation in frequency of each vibrator element, the resulting signal may not be an exact spike, only spike-like. However, based on knowledge of the emitted signal and depth of each vibrator element, the composite directional signal leaving the source may be computed and shaped to a spike in data processing as a directional designature. The directional designature may also compensate for source motion, for example, as described in PCT/EP2014/065760.

In one embodiment, different amplitudes may be chosen for each vibrator along with different phases. The different amplitudes and phases may be used to encode the signal, which is not affected by ghosts.

In other embodiments, the source elements are not vibrators each outputting a single frequency, but vibrators sweeping a frequency range. A deviation from maximal constructive interference between the ghost and the down-going emitted wave occurs if depth remains constant while frequency varies. However, this deviation is small if the sweep frequencies are close to the peak frequency (e.g., a range 330 as illustrated in FIG. 3).

Figure 8:
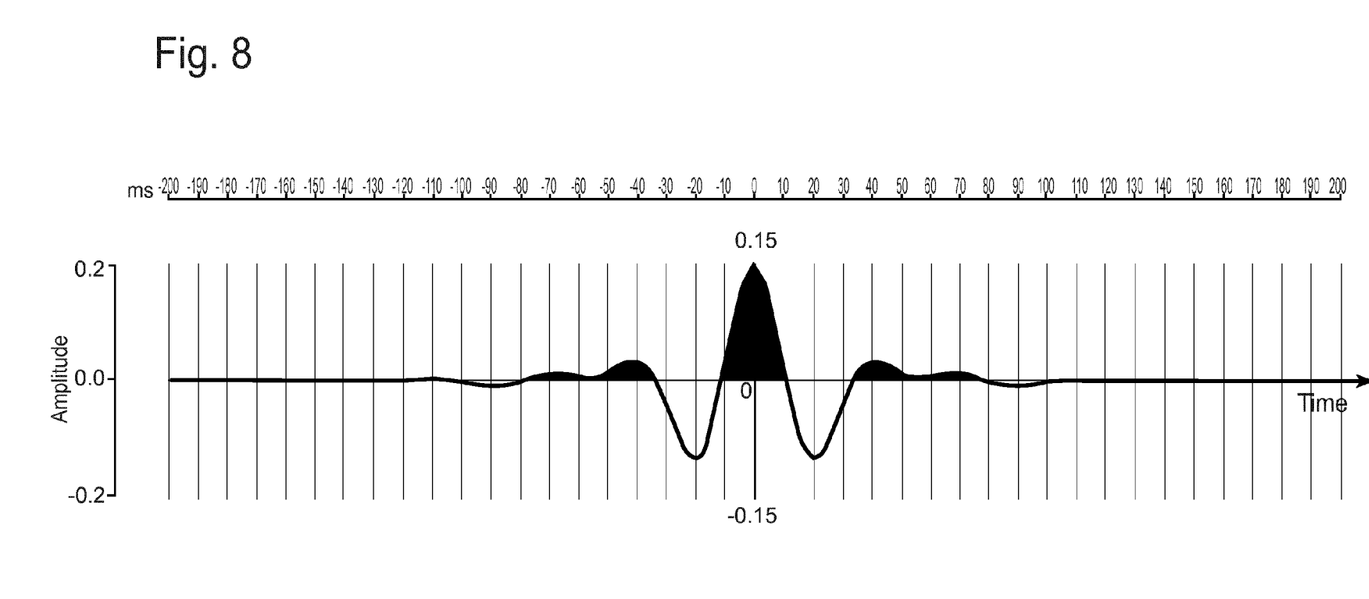
FIG. 8 illustrates a signal in the time domain according to an embodiment.
Figure 9:
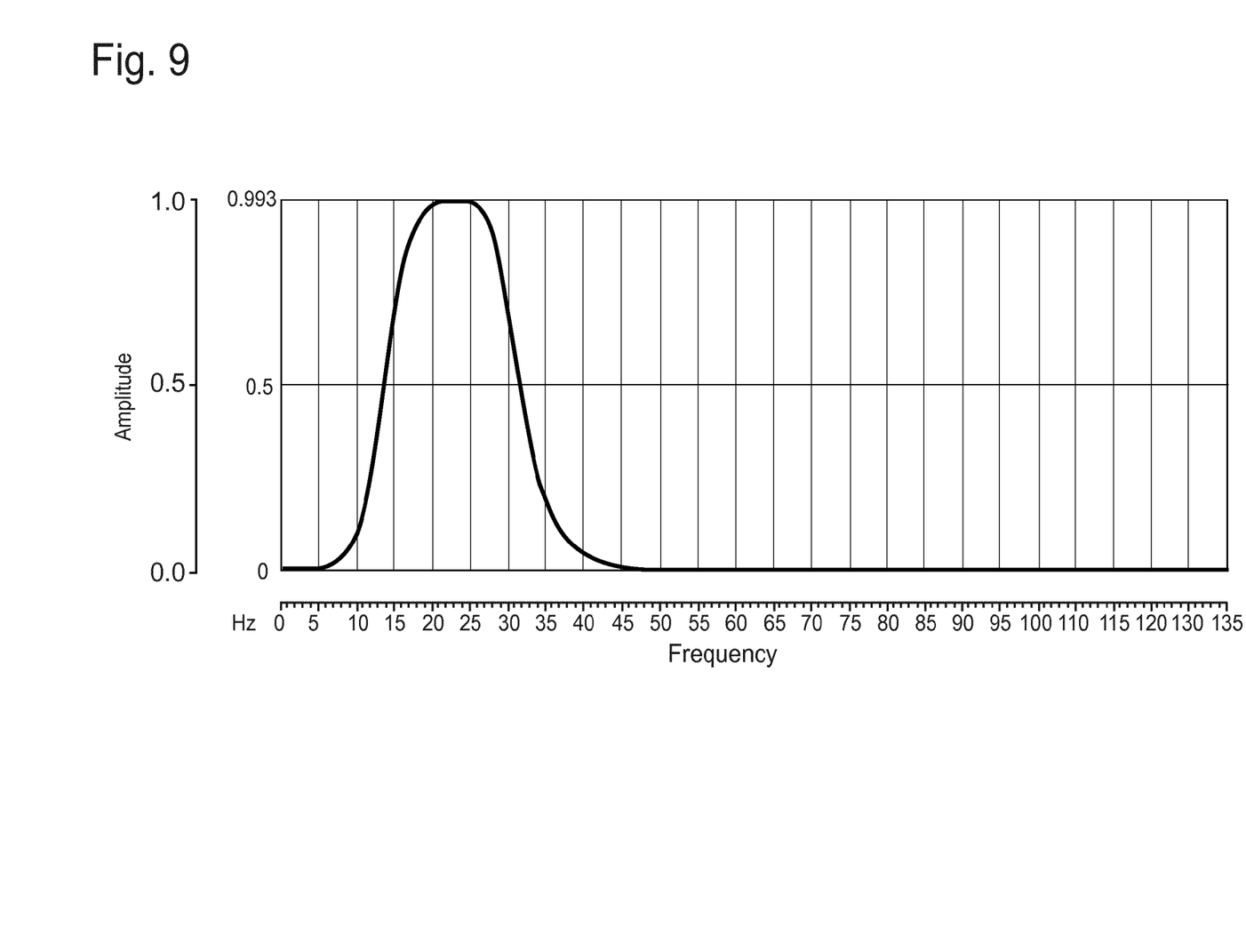
FIG. 9 is the signal in FIG. 8, in the frequency domain.

Instead of sweeping over a narrow band frequency range, the vibrators may emit pseudo-random signals that are band limited as required. Alternatively, the vibrators may emit waves according to a step sweep (also known as a "digital sweep"), during which a vibrator emits a mono-frequency wave for a predetermined interval and then abruptly switches to emit at another frequency. Vibrators may be used to output all frequencies within a given bandwidth simultaneously. The resulting time domain signal is illustrated in FIG. 8, and its frequency domain correspondent is similar to a band-pass filter as illustrated in FIG. 9. Using vibrators that cover a range of frequencies yields a near-impulsive net response with greater comb sampling (i.e., time between consecutive spikes) than using mono-frequency vibrators.

Whether each vibrator element emits substantially at a single frequency or at a range of frequencies, the net response of the source may be designed so that the resulting composite amplitude spectrum (including free surface ghost) is substantially flat, and the resulting output signal is focused, or spike-like, in time.

In one embodiment, if a vibrator sweeps (either a linear sweep, a step sweep, pseudo-random sweep or other band-limited emission) over a significant range of frequencies, its depth may be varied as it sweeps (i.e., as a function of time) to cause optimal interference of the ghost and the down-going (primary) emitted wave. For example, referring back to Table 1, a vibrator sweeping from 12.5 Hz to 25 Hz would vary its depth from 30 m to 15 m, another vibrator sweeping from 6.250 Hz to 12.5 Hz would vary its depth from 60 m to 30 m, etc. In one embodiment, the rate of changing the frequency in the higher frequency range of a sweep is faster than the rate of changing the frequency in the lower frequency range of the sweep, since depth varies less in the higher range than in the lower range for the same frequency difference. Higher spatial resolution may be needed for high frequencies than for low frequencies which may also at least partially define the sweep length.

Figure 10:
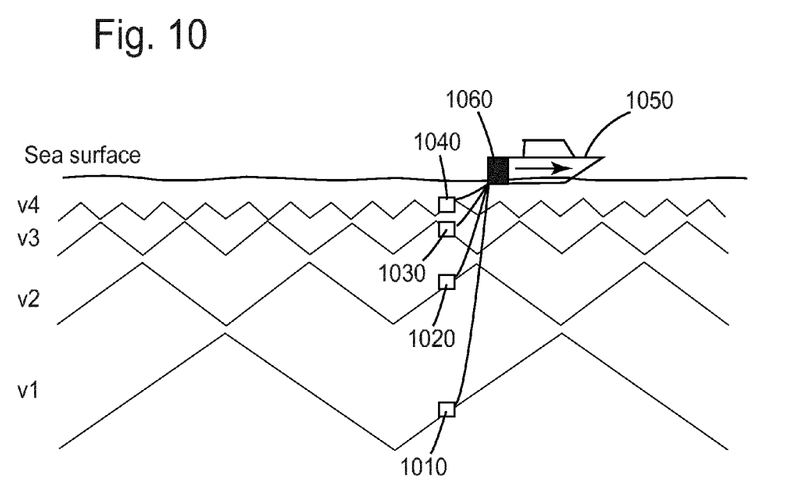
FIG. 10 is a marine seismic survey system according to another embodiment.

FIG. 10 illustrates a marine source including the series of vibrators 1010 (v1), 1020 (v2), 1030 (v3), and 1040 (v4) towed by a vessel 1050. Each of the vibrators varies its depth and its frequency as summarized in Table 2.

TABLE 2

| Vibrator | Start freq (Hz) | Start depth (m) | End freq (Hz) | End depth (m) |
|---|---|---|---|---|
| v1 | 5 | 75 | 10 | 37.5 |
| v2 | 10 | 37.5 | 20 | 18.75 |
| v3 | 20 | 18.75 | 40 | 9.375 |
| v4 | 40 | 9.375 | 80 | 4.6875 |

The vibrators may change depth at a rate of about 1 m/s. One way to achieve this depth variation is by connecting hoses configured to transmit pressured air to the source elements. The pressured air would change source element's buoyancy making the source element to change its depth. A depth controller 1060 may be located on vessel 1050 to control depth of one or more of the source elements. In some embodiments only one or some of the source elements vary their depth. The vibrators may have linear trajectories as illustrated in FIG. 10 or may have sinusoidal paths or paths with other shapes. Note that unlike in FIGS. 5 and 6, in FIG. 10, the individual source elements are towed using separate cables (tow lines).

With mono-chromatic vibrators or vibrators that operate over a limited bandwidth, the reflections caused by waves emitted by each of the vibrators may be separated on the receiver side using band-pass filters. After separation, the phase of each signal may be modified as necessary. The same approach may be applied for band-limited pseudo-random sweeps. In this case, the signal may be shaped after separation. The individual source elements may be towed by one or more vessels. In one embodiment, at least some of the individual sources may be fixed (e.g., on the seabed or land).

Figure 11:
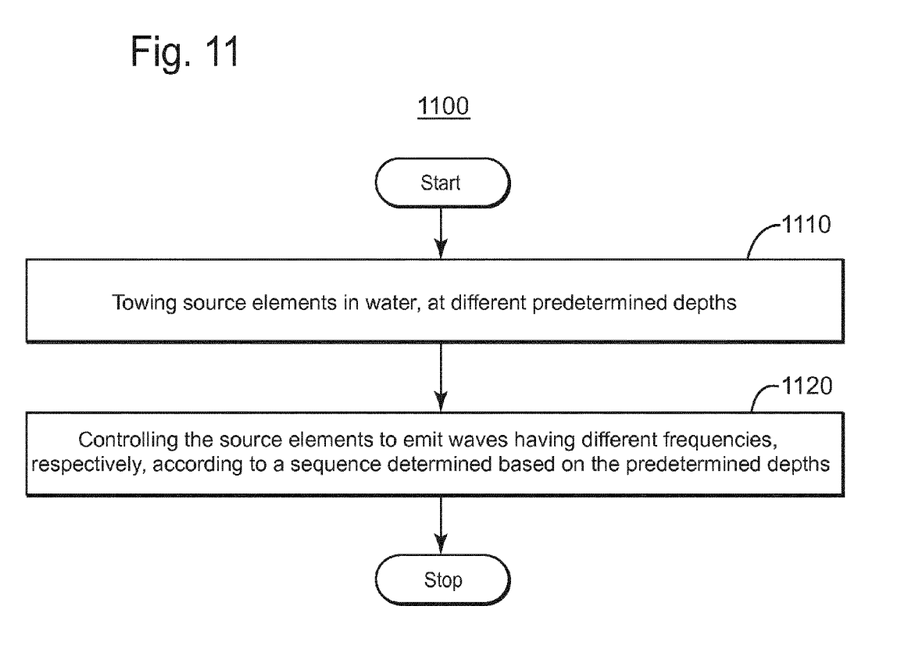
FIG. 11 is a flowchart of a method according to an embodiment.

FIG. 11 is a flowchart of a method 1100 for generating waves usable for exploring a formation under the seafloor. Method 1100 includes towing source elements in water, at different predetermined depths, at 1110. The predetermined depths are calculated such that water-surface reflections of the waves interfere constructively with the waves propagating toward the explored formation. A deeper towed one among the source elements emits at a lower frequency than a shallower towed one among the source elements.

Method 1100 further includes controlling the source elements to emit waves having different frequencies, respectively, according to a sequence determined based on the predetermined depths, at 1120.

The disclosed embodiments describe seismic sources configured to use water-surface reflections to enhance the spike-like signal incident on an explored underground structure. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine seismic source, comprising:
   a plurality of source elements configured to emit waves having different frequencies while the source elements are towed at different predetermined depths, respectively,
      the predetermined depths being calculated such that down-going waves generated by a source element among the source elements at one of the predetermined depths interfere constructively with water-surface reflections due to up-going waves generated by the source element; and
   a controller configured to control the source elements to emit the waves with predetermined time delays, respectively, so that the waves from all the source elements interfere constructively with each other to yield a spike-like signature of the marine seismic source at an explored structure.

2. The marine seismic source of claim 1, wherein the different predetermined depths of the source elements are correlated with the different frequencies of the waves emitted by the source elements, such that products of the different predetermined depths and the different frequencies, respectively, are substantially equal to the same value.

3. The marine seismic source of claim 1, wherein the different frequencies are multiples of a base frequency.

4. The marine seismic source of claim 1, wherein the waves emitted by at least two among the source elements have different amplitudes and/or different phases to encode a signal incident on the explored structure under the seafloor.

5. The marine seismic source of claim 1, wherein the source elements are distributed along a variable-depth profile.

6. The method of claim 5, wherein the variable-depth profile includes at least one portion having a shape defined by a parameterized curve.

7. The marine seismic source of claim 1, wherein each of the different frequencies includes a predetermined range of frequencies around a target peak frequency, the predetermined range of frequencies being substantially smaller than a difference between any two among the different frequencies.

8. The marine seismic source of claim 1, further comprising:
   a depth controller configured to vary a first depth of a first source element among the source elements while towed, the first source element emitting first waves with a first frequency varying in time such that to maintain a product of the first frequency and the first depth of the first source element substantially constant.

9. A marine seismic source, comprising:
   cable segments housing source elements and configured to be towed one after another to form a towed line or rope and configured to emit waves having different frequencies while the source elements are towed at different predetermined depths, respectively,
      the predetermined depths being calculated such that down-going waves generated by a source element among the source elements at one of the predetermined depths interfere constructively with water-surface reflections due to up-going waves generated by the source element; and
   a controller configured to control the source elements to emit the waves with predetermined time delays, respectively, so that the waves from all the source elements interfere constructively with each other to yield a spike-like signature of the marine seismic source at an explored structure.

10. The marine seismic source of claim 9, wherein the cable segments include at least one cable segment configured to be connected to a streamer segment housing one or more seismic receivers.

11. The marine seismic source of claim 9, wherein one or more of the cable segments jointly house receiver and source elements.

12. The marine seismic source of claim 9, wherein the controller is further configured to control the source elements to emit the waves with the predetermined time delays relative to a same start time.

13. The marine seismic source of claim 9, wherein the variable-depth profile includes a portion having a shape defined by a parameterized curve.

14. A method for generating waves usable for exploring a formation under the seafloor, the method comprising:
   towing source elements in water, at different predetermined depths; and
   controlling the source elements to emit waves having different frequencies, respectively, according to a sequence determined based on the predetermined depths, such that the waves combine to yield a spike-like signature of the source,
   wherein the predetermined depths are calculated such that water-surface reflections of the waves generated by a source element among the source elements interfere constructively with the waves propagating toward the explored formation and generated by the source element, and wherein the controller further controls the source elements to emit the waves with predetermined time delays, respectively, so that the waves combining from all the source elements interfere constructively with each other to yield the spike-like signature of the marine seismic source at the explored formation.

15. The method of claim 14, wherein the source elements are housed by at least two cable segments configured to be towed one after another to form a towed line or rope.

16. The method of claim 14, wherein the towed line or rope has a variable-depth profile that includes a portion having a shape defined by a parameterized curve.

17. The method of claim 14, further comprising:
varying a source-element depth and a source-element frequency for at least one of the source elements, while maintaining a product of the source-element depth and the source-element frequency substantially constant.

* * * * *